Oct. 16, 1951 C. S. SZEGHO 2,571,306
CATHODE RAY TUBE FOCUSING SYSTEM
Filed Jan. 31, 1947
FIG. 3.
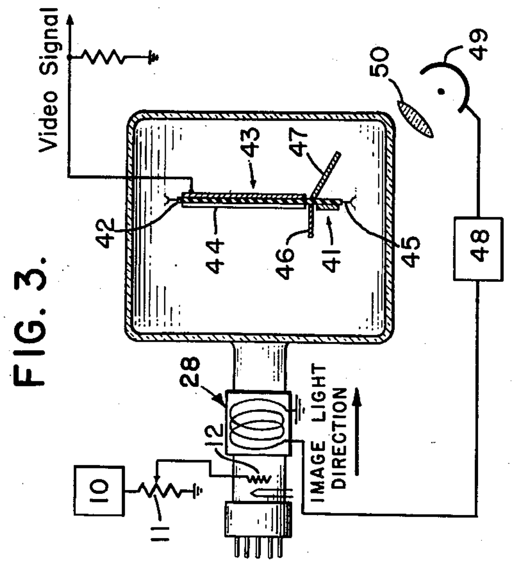
FIG. 2
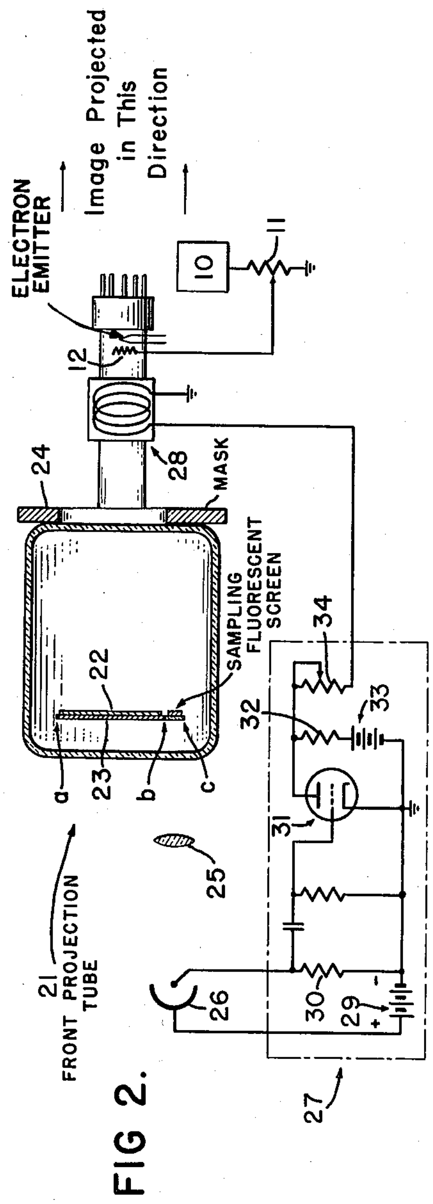
FIG. I.
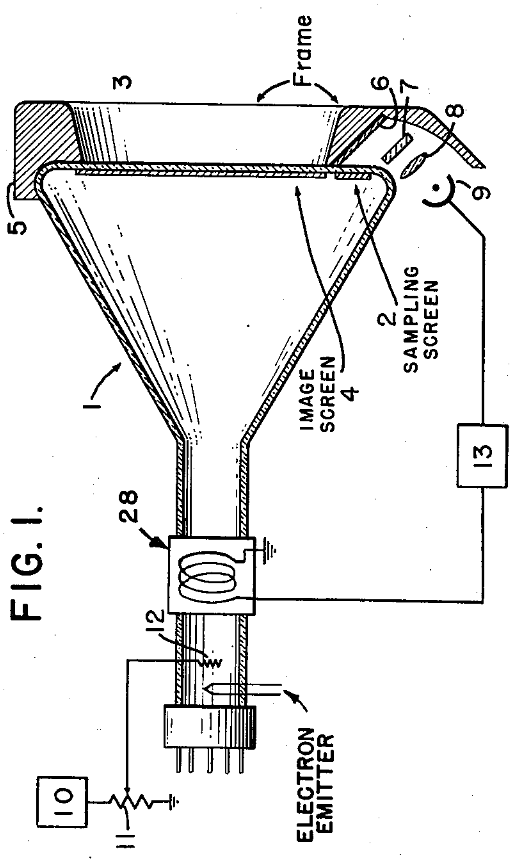
INVENTOR.
CONSTANTIN S. SZEGHO
BY Paul Colia[?]
ATTORNEY Patented Oct. 16, 1951 2,571,306

UNITED STATES PATENT OFFICE 2,571,306

CATHODE-RAY TUBE FOCUSING SYSTEM

Constantin S. Szegho, Chicago, Ill., assignor to The Rauland Corporation, Chicago, Ill., a corporation of Illinois Application January 31, 1947, Serial No. 725,459

5 Claims. (Cl. 315—10)

This invention relates to new and useful improvements in cathode ray devices which translate image-modulated light emissions into electrical signals and which translate electrical signals into facsimiles of images. More particularly, it relates to improvements in the apparatus associated with a tube such as an iconoscope or a kinescope which focuses its electron beam or, as it is sometimes called, its cathode ray.

It is well known that the degree of resolution achieved with television apparatus depends to a great extent upon the precision with which the focusing of the electrons in its "cathode ray" causes them to converge upon a very small pinpoint area at the point of projection of the electron beam on the surface which it is adapted to scan. The importance of perfect focusing becomes apparent in considering the example of a cathode ray projector tube. Such a tube usually emits light at a very high average-intensity level and, therefore, projects an image which may be enlarged many times on a theater projection screen. Poor resolution of image detail at the projector would limit permissible enlargement, i. e. would limit the distance between the projector and the screen and would also limit screen size inasmuch as imperfection of details becomes more apparent as greater enlargement is employed. In the case of large size direct viewing tubes the difficulties involved in securing optimum focus at all points on the screen as well as detrimental effects caused by poor focusing in any part of the screen increase with screen size. This good focusing is important where a large facsimile is desired whether it is to appear on the tube itself or elsewhere. As the television art progresses it becomes more and more important that focus be continuously and automatically controlled.

In general, according to this invention, a focus sampling fluorescent area is included in the cathode ray device. During sampling intervals the area will be scanned by the electron beam and will emit light whose average intensity will vary in a predetermined manner if the stream of electrons becomes de-focused. During any transient interval of time de-focusing will cause the stream of electrons to energize a larger portion of the fluorescent area than usual, while at the same time the electron density per unit area will diminish. The fluorescent material used and the operating conditions selected are such that normal beam current density is greater than that at which the fluorescent material saturates, i. e.

current density is beyond the region where brightness increased substantially lineally as a function of current density. Hence, any part of the enlarged spot will be as bright as any part of a corresponding spot before de-focusing and the total light therefrom will increase. A light-sensitive device is employed to monitor changes in average light emissions from the sampling fluorescent area. It will respond to changes therein so as to translate them into electrical signals. The electrical signal is employed by appropriate circuits to alter the operating conditions of the focusing apparatus used in the cathode ray device so that it functions to compensate for the de-focusing. For example, in an electrostatic kinescope the values of one or more of the focusing potentials would be adjusted. In a magnetically focused device it would be the magnitude of the focusing coil current which would be altered.

It is obvious that in preferred embodiments the fluorescent material should "normally" (during optimum focus conditions) be saturated. For otherwise, under certain conditions in which neither the number of electrons reaching the fluorescent area nor their average velocity will necessarily be altered by de-focusing (they are merely spread out) the light-sensitive device might receive the same total amount of light from the increased area as it did from the smaller but brighter area under conditions of optimum focusing.

On the other hand, a fluorescent substance may be employed which will not emit light of any significant intensity until the electron density per unit area exceeds a certain minimum value. In such a case diffusion of the beam over an increased area (as a result of de-focusing) would cause a decrease in the total light emitted and the control circuits would have to be arranged accordingly.

Where certain fluorescent material is employed which saturates at a current density level less than normal and produces light of a certain color and where it is mixed with other material which does not saturate at the normal current density level and which emits differently colored light, a condition would be attained in which de-focusing would cause the total level of the light emissions of the one to increase significantly with respect to the emissions of the other and the mixed color emitted would vary with de-focusing. If this type of sampling fluorescent area is employed, the light-sensitive device would include a filter adapted to pass light of the color of the emissions which increase with de-focusing and thus it would be light-color selective.

It might be advantageous to employ a mixture of fluorescent materials as the color of light emitted from the sampling area could be used as an index in adjusting the apparatus.

In any of the presently existing television systems there are time intervals which occur between the high frequency sweeps and during which the electron beam is blanked out to eliminate visible indications of retraces. A portion of each of these intervals of unused time may be employed for sampling instantaneously existing focusing conditions. Sampling may occur before or after each high frequency sweep.

The focus correcting process may be made as fast as possible depending on the decay time of the fluorescent material (usually the greater part of the light energy is released after the beam is no longer exciting the area) and on the time constants of the control circuits, or it may be relatively slow. In any case the corrected condition of focus should remain relatively constant at least during a period of time equal to that required for one high frequency scan.

The electron beam may be intensity modulated, for example, by locally produced square wave pulses of adjustable amplitude, so that the normal light intensity of emissions from the sampling fluoroescent area can be set to be relatively constant except for changes caused by variations in focusing.

Other objects, features and advantages of this invention will be apparent to those skilled in the art from the following description of certain illustrative embodiments and from the drawings, in which Fig. 1 is a diagrammatic representation of an embodiment of this invention in which the cathode ray device is an electrostatically focused direct viewing kinescope.

Fig. 2 is a diagrammatic representation of an embodiment of this invention in which the cathode ray device is a front projection tube whose electron beam is magnetically focused.

Fig. 3 is a diagrammatic representation of an embodiment of this invention in which the cathode ray device is an iconoscope.

The embodiment shown in Fig. 1 employs a sampling fluorescent screen the composition of which includes two powders which saturate the different levels of electron beam density and which emit light of different colors. The partial cross section shown in Fig. 1 may be considered as taken in a plane through the long axis of cathode ray tube 1 parallel to its horizontal deflection plates, not shown, (the plates which are fed with low frequency sweep voltages). Thus, it is seen that the narrow sampling screen 2 runs along one edge of the large end 3 of the tube and is disposed with its longer dimension extending crosswise to the general direction of the high frequency sweeps. In this particular embodiment it may be assumed that each high frequency sweep starts on the area of the sampling fluorescent screen 2 and progresses across the tube (upward on the page containing Fig. 1) so that it soon leaves the sampling screen and moves up to and past the adjacent edge of the image fluorescent screen 4. Obviously, no picture signal should be fed to the electrode which intensity modulates the beam until the beam has reached this edge and has moved onto the image screen.

A frame 5 may be set over the end of the viewing tube to serve as a masking overlay. It will surround thereon an exposed area, of a preferred shape such as rectangular, which will correspond to the scanned portion of the image screen while at the same time one of its sides will mask the sampling fluorescent screen to prevent light emitted thereby from reaching the observers. A mirror 6 is arranged so that light emitted by the sampling screen and projected upon it will be reflected by it to certain light intensity monitoring components. The purpose in using a mirror in this embodiment is that it permits these components to be conveniently located. As will be explained below, in embodiments which employ the kind of two-powder sampling screen described above, the light monitoring components can be rendered more sensitive by using a color light filter. Such a filter is shown in Fig. 1 as element 7. Lens 8 is arranged so as to gather a substantial portion of the light which comes from the sampling screen and is reflected back by the mirror and to focus it upon the light-sensitive part of photoelectric cell 9.

Block 10 represents a square wave pulse generator which is arranged to operate in synchronism with the high frequency sweeps. Its output is fed through a potentiometer 11 to an electrode 12 of tube 1, such as a control grid, which is adapted to control the intensity of the electron beam. The purpose of pulse generator 10 is to provide means for energizing sampling fluorescent screen 2 at a uniform and optimum level.

The output of photoelectric cell 9 is fed to block 13, which may comprise conventional circuits designed in accordance with well-known standards to perform functions described below. These circuits may include one or more amplifiers and such other elements as means for inverting polarity where the particular layout requires it. Block 13 converts each change in the magnitude of the current through the photoelectric cell, which occurs because of a variation in the intensity of the light from the saturated fluorescent material, into one or more changes in the appropriate directions in one or more voltages which are fed to one or more focusing electrodes of tube 1.

In operation apparatus such as that shown in Fig. 1 may be adjusted in substantially the following manner: With the sweep voltage sources disconnected or shut off and with the point of projection of the electron beam on screen 3 positioned on the image fluorescent screen, the conventional focus control which by way of illustration is coil 28, and intensity control which is not shown, are adjusted in accordance with usual standards until a spot of desired size and brightness is obtained. Free running sweeping is placed into operation and pulse generator 10 is turned on. Potentiometer 11 is slowly and progressively turned in the direction which increases the amplitude of the pulses fed to electrode 12, i. e. is "turned up." This should be done with frame 5 and mirror 6 removed. As the potentiometer is turned up it will be seen that the emissions from the sampling area will increase in intensity within certain limits and, more particularly, will undergo certain color changes. The color changes will depend on the kind of fluorescent powders employed in forming the sampling screen.

For example, an appropriate fluorescent powder may be a mixture of such a saturating component as zinc sulphide, which when it fluoresces produces blue light, and such a non-saturating component as beryllium silicate, which produces yellow light. Assuming that the potentiometer is linear and that it is turned up in a linear manner, nevertheless a point will be reached beyond which, despite continued turning up, the rate of increase in the brightness of the blue emissions, i. e. those of the saturating component, will drop off sharply and will cease to be linear, even if it had been linear up to that point. The rate of increase in the brightness of the yellow component will remain relatively constant for some distance beyond that point. Therefore, the mixed color will vary the yellow portion thereof progressively, predominating more and more. A point may be reached at which the yellow component also saturates. Thereafter, significant color changes for additional increases in beam current density will cease to occur. A proper operational adjustment of potentiometer 11 will be one which lies between these two points. With the potentiometer set in this region diminutions in electron beam density which result from de-focusing which will not lessen the brilliance of the emissions per unit area of the blue component inasmuch as it is already saturated. Therefore, since a greater area is energized the total blue light emitted will increase. However, the diminutions in electron beam density will directly affect the brilliance of the yellow light emissions per unit area and this will more or less compensate for the fact that a larger total area is being bombarded. Therefore, de-focusing which occurs when potentiometer 11 is adjusted in this manner will cause the mixed color to change so that the ratio of blue light to yellow increases, i. e. more blue light will be emitted while the yellow light remains substantially at the same level.

It is apparent that filter 7 is not essential, since the total mixed light will increase each time defocusing occurs and certainly the photo cell may be adapted to respond to such increases. However, if filter 7 excludes yellow light from the photoelectric cell then changes which occur substantially only in the blue light during de-focusing, will be larger percentagewise with respect to the amount of light which actually reaches the photoelectric cell before de-focusing and this will render the monitoring apparatus sensitive.

Obviously, for best results the photoelectric cell must be adjusted to optimum operating conditions as to its plate voltage and as to the extent of its exposure to light from the sampling screen. Its normal current during conditions of satisfactory focus should neither be as little as its dark current nor as large as its current when saturated. When the photoelectric cell is properly adjusted the above-described changes in the level of blue emissions will cause useful current changes in photoelectric cell 9. These current changes may be translated into voltage changes across an impedance in block 13 and thereafter processed in one or more amplifiers in accordance with well-known practices to meet the requirements of particular installations. The output of block 13 is fed to and changes the potentials on one or more electrodes of the focusing apparatus of tube 1. The changes are of proper polarities and magnitudes so that the overall effect is to compensate for the de-focusing.

The embodiment shown in Fig. 2 differs from the embodiment of Fig. 1 primarily in the following: The cathode ray device in this case is a front projection tube; the sampling fluorescent screen uses what may be a less complex material which fluoresces in substantially the same color throughout its emission intensity range, i. e. as beam current density is progressively varied, but has a definite saturation point (which is what makes it useful in this application); the filter part of the monitor apparatus of Fig. 1 is excluded because of the mono-color emissions; and focusing in this case is magnetic.

Front projection tube 21 may be of the type which projects fluorescent light from the same side of its fluorescent screen as that upon which the electron beam is projected. This type of construction is sometimes preferred because of greater useful brilliance and increased useful light output. According to the well-known construction of this kind of screen the image fluorescent screen 22 consists of a layer of fluorescent material which is deposited on what may be a non-transparent and even a metallic sheet support 23. In the drawing support 23 extends between points *a* and *b*. The sampling fluorescent screen consists of a layer of saturating powder placed on a strip of transparent material, such as glass, which may be physically attached to support 23 with one of its edges abutting against and extending thereof. Part of the figure represents a cross section taken in a plane parallel to the general direction of the high frequency sweeps and perpendicular to support 23. Therefore, as was explained in detail with respect to the embodiment of Fig. 1 and as is also true in this case, each high frequency sweep traverses both the sampling fluorescent screen and the image fluorescent screen. The sampling screen extends in width from *b* to *c*.

Frame 24 is an overlay which corresponds to frame 5 of Fig. 1 and serves a similar purpose, i. e. that of preventing light emissions from the sampling fluorescent screen to be projected upon the viewing screen while not interfering with facsimile projections. The exact choice of structure employed for a masking frame is no essential part of the invention, but may be made to depend on such considerations as economy, good appearance, etc., so long as any particular frame can perform the simple optical function described herein and is adapted to the requirements of the particular installation in which it is used. For example, where a lens system is used to project upon a suitable screen the image produced by this kind of tube, the masking frame may be an opaque overlay properly applied to one side of the lens so as to cut off the emissions of light which originate from the sampling screen.

Lens 25 focuses light from the sampling screen upon the light-sensitive element of photoelectric cell 26. Block 27 receives the output of photoelectric cell 26 and employs it to vary the magnitude of the current through focusing coil 28 so as to compensate for the change which caused de-focusing. The particular circuit details employed for block 27 are no essential part of this invention. In the present state of the art a wide variety of different types of circuits are available, any one of which may be adapted to employ the output of the photoelectric cell to control the current input to the focusing coil. However, a circuit is shown inside block 27 for illustrative purposes. It comprises a source of potential 29, for energizing the photoelectric cell, a resistor 30 across which changes in current through the photoelectric cell will appear as voltage variations, and a vacuum tube 31 which, since those voltage variations are impressed on its control grid, will act as a variable impedance. Tube 31 performs its control function by being connected in shunt across focusing coil current limiting resistor 32. Another source of potential 33 causes the focusing current to be forced through the focusing coil as well as the limiting resistor 32 and a manually controllable resistor 34. It is obvious that normal focus adjustments may be made by varying the setting of resistor 34 and that automatic focusing adjustments according to this invention are effected by tube 31.

Fig. 3 shows the application of the principles of this invention to an iconoscope. An iconoscope ordinarily has no light emitting element since it is adapted to receive light instead of to emit it. Therefore, sampling fluorescent screen 41, which is added to the structure of the tube according to this invention, may be the only fluorescent area included therein.

A detailed description of the monitoring and controlling components has been presented herein with respect to Figs. 1 and 2. It is unnecessary to describe them again to show how they are applied in this embodiment. This embodiment may be considered as employing some monocolor saturating fluorescent powder as in the case of Fig. 2. The supporting structure for the mosaic may be a thin sheet of mica 42. Back plate 43 is the well known capacitive video signal pick-up element attached to the side of the mica sheet opposite to that on which the mosaic is attached. Mosaic 44 also represents any conventional kind of mosaic. Wires 45 represent supporting means for the mica sheet and the elements attached to it. Besides the sampling fluorescent screen other added structure includes first and second light shields 46 and 47.

It is obvious that when the electron beam bombards the parts of sampling screen 41 light emitted from it might reach the adjacent edge of mosaic 44. It is for this reason that the shield 46 is required. Shield 47 is not equally essential but may serve a useful purpose in some applications where without it light from the sampling screen might reach and distract operators of the pick-up equipment.

Block 48 of Fig. 3 corresponds in purpose and function either to block 13 of Fig. 1 or block 27 of Fig. 2, depending on the kind of focusing apparatus employed in the tube. The photoelectric cell 49 and the lens 50 correspond to the photoelectric cells and lenses employed in the other embodiments and already described in connection therewith.

It is obvious that control apparatus according to this invention is adaptable to pick-up cathode ray devices which are not of the kind shown in Fig. 3. Components corresponding to the sampling fluorescent screen herein described as well as the monitoring apparatus may be readily employed in and with a wide variety of pick-up devices which include dissector tubes, two-sided mosaic iconoscopes, barrier grid tubes, etc. Likewise, in the case of the other large class of cathode ray devices, those which, conversely, are adapted to translate electric signals into image facsimiles, the scope of this invention includes a corresponding wide variety. For example, it includes the kind of tube whose bombarded area instead of fluorescing under the impact of electrons varies in opacity so that it can be used to modulate light from a separate source (in a manner corresponding to the projection of light through a moving picture film) and so that an image facsimile is nevertheless produced.

Apparatus which intensity modulates the electron beam with square wave pulses which are applied during intervals of time when the sampling fluorescent screen is being scanned is represented in Figs. 2 and 3. In structure and function it corresponds to apparatus also represented in the first figure and only described in connection therewith. Prior to operation the amplitude of the intensifying pulses used in the embodiments of Figs. 2 and 3 should be adjusted as follows: Potentiometer 11 should be turned up to some convenient point beyond that at which brightness ceases increasing in linear fashion with current density. This simply means that the beam current density is increased to some point beyond that at which the sampling screen saturates.

It is also within the scope of this invention to use a non-saturating fluorescent material (or, for that matter, a saturating fluorescent material which is normally energized at beam current densities for lower than those which cause saturation).

In such cases, beam current density, i. e. "intensity" would be adjusted to the low level below which such a diminution in current density per unit area is caused by de-focusing that the screen substantially ceases to emit light of any significant intensity. The adjustment of beam current density obviously is not governed by the existence or location of any saturation point. The arrangement of the circuits, which employ the output of the photoelectric cell to serve a control purpose, would be somewhat different inasmuch as de-focusing would be signalized by decreases in sampling light and in photoelectric current rather than increases therein. Due to the low level of the sampling light emissions it might be advisable to use a multiplier photoelectric tube which, as is well known, has far greater sensitivity to light and to light changes than ordinary photoelectric tubes.

What I claim is:

1. Focus controlling apparatus for a cathode ray device which has gun means adapted to project and to focus a cathode ray stream of electrons comprising focus sampling fluorescent means having an area, the gun means being adapted to project and to focus the cathode ray on the fluorescent means and thereby to impart energy thereto, the fluorescent means being adapted to emit light when it receives energy fram the ray and to saturate when that energy exceeds a certain amount per subdivisional unit of the area, the gun means being adapted to impart to the fluorescent means by the ray at least enough energy per unit area to cause it to saturate, light-sensitive means arranged to receive light emissions from the sampling fluorescent means and adapted to convert variations in the intensity of received light emissions into electrical current variations, focus correcting means associated with the light-sensitive means and the gun means and adapted to control the focus of the cathode ray in a predetermined manner in response to the electrical current variations.

2. In a cathode ray device having gun means adapted to project and to focus a cathode ray, a sampling screen of fluorescent material composed of saturating zinc sulphide mixed with relatively non-saturating beryllium silicate, the zinc sulphide being adapted to emit light of a first color when fluorescing and the beryllium silicate to emit light of a second color when fluorescing, the gun means being adapted to energize the fluorescent material on the sampling screen with the cathode ray in such a manner that the fluorescence of the zinc sulphide is saturated whereas that of the beryllium silicate is not saturated, that mixed color fluorescence will occur, and that the mixed color fluorescence will change with the proportion of light emissions of the first color to those of the second color becoming greater when the cathode ray becomes de-focused, light-sensitive means adapted to monitor changes in mixed color fluorescence, and focus correcting circuit means adapted in cooperation with the light-sensitive means to employ changes in mixed fluorescence in a predetermined manner to control the gun means so as to compensate for de-focusing.

3. A focus controlling apparatus for a cathode ray device, including a sampling fluorescent screen, the sampling fluorescent screen being adapted to emit a changed amount of light when the cathode ray becomes de-focused, light sensitive means positioned in relation to said sampling screen so that light from said sampling screen is directed upon said light-sensitive means, said light sensitive means being adapted to translate said changes in light emissions into electrical signals, and correcting means connected between said light sensitive means and said cathode ray device, said correcting means being adapted to use said electrical signals to correct the de-focusing.

4. In a cathode ray device having an electron beam and an image fluorescent area and adapted to translate an electrical signal into a light-emitting facsimile of an image, a focus sampling fluorescent area, said area being adapted to emit a changed amount of light when the cathode ray becomes de-focused, light-sensitive means positioned in relation to said area so that light from said sampling fluorescent area is directed upon said light-sensitive means, said light sensitive means being adapted to translate said changes in light emissions into electrical signals, and correcting means connected between said light sensitive means and said cathode ray device, said correcting means being adapted to use said electrical signals to correct the de-focusing.

5. In a cathode ray device in the form of an iconoscope having an electron beam, including a sampling fluorescent screen, the sampling fluorescent screen being adapted to emit a changed amount of light when the cathode ray becomes de-focused, light sensitive means positioned in relation to said sampling screen so that light from said sampling screen is directed upon said light-sensitive means, said light sensitive means being adapted to translate said changes in light emissions into electrical signals, and correcting means connected between said light sensitive means and said cathode ray device, said correcting means being adapted to use said electrical signals to correct the de-focusing.

CONSTANTIN S. SZEGHO.

REFERENCES CITED

The following references are of record in the file of this patent:

UNITED STATES PATENTS

| Number | Name | Date |
|---|---|---|
| 2,077,442 | Tedham et al. | Apr. 20, 1937 |
| 2,124,404 | Schroter | July 19, 1938 |
| 2,134,851 | Blumlein | Nov. 1, 1938 |
| 2,196,838 | Rogowski et al. | Apr. 9, 1940 |
| 2,310,671 | Batchelor | Feb. 9, 1943 |
| 2,398,642 | Homrighous | Apr. 16, 1946 |
| 2,454,652 | Iams et al. | Nov. 23, 1948 |